United States Patent
Dai et al.

(10) Patent No.: US 11,947,503 B2
(45) Date of Patent: Apr. 2, 2024

(54) AUTOREGRESSIVE GRAPH GENERATION MACHINE LEARNING MODELS

(71) Applicant: Google LLC, Mountain View, CA (US)

(72) Inventors: Hanjun Dai, Atlanta, GA (US); Azade Nazi, San Jose, CA (US); Yujia Li, London (GB); Bo Dai, San Jose, CA (US); Dale Eric Schuurmans, Edmonton (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/351,086

(22) Filed: Jun. 17, 2021

(65) Prior Publication Data
US 2022/0414067 A1    Dec. 29, 2022

(51) Int. Cl.
*G06F 16/21* (2019.01)
*G06F 16/22* (2019.01)
*G06N 3/045* (2023.01)

(52) U.S. Cl.
CPC ........ *G06F 16/212* (2019.01); *G06F 16/2237* (2019.01); *G06F 16/2246* (2019.01); *G06N 3/045* (2023.01)

(58) Field of Classification Search
CPC ............... G06F 16/212; G06F 16/2237; G06F 16/2246; G06N 3/0454; G06N 3/045
See application file for complete search history.

(56) References Cited

U.S. PATENT DOCUMENTS

| | | | |
|---|---|---|---|
| 2021/0150373 A1* | 5/2021 | Crouse | G06N 5/013 |
| 2022/0019889 A1* | 1/2022 | Aum | G06N 3/063 |
| 2022/0027707 A1* | 1/2022 | Wu | G06F 16/9024 |
| 2022/0405455 A1* | 12/2022 | Ghose | G06F 30/398 |

OTHER PUBLICATIONS

You et al., "GraphRNN: Generating Realistic Graphs with Deep Auto-regressive Models", Jun. 23, 2018 (Year: 2018).*
Dinella et al., "Hoppity: Learning Graph Transformations To Detect And Fix Bugs In Programs", 2020 (Year: 2020).*
Guo et al., "A systematic Survey on Deep Generative Models for Graph Generation", Jul. 2020 (Year: 2020).*
Tan et al., "Recursive Top-Down Production for Sentence Generation with Latent Trees", 2020 (Year: 2020).*

(Continued)

*Primary Examiner* — Dawaune A Conyers
(74) *Attorney, Agent, or Firm* — Fish & Richardson P.C.

(57) ABSTRACT

Methods, systems, and apparatus, including computer programs encoded on a computer storage medium, for generating data defining a graph. In one aspect, a method comprises: sequentially generating a respective edge set for each node in the graph, wherein for each of a plurality of nodes after a first node, generating the edge set for the node comprises: receiving a context embedding for the node that summarizes a respective edge set for each node that precedes the node; generating, based on the context embedding for the node: (i) a respective edge set for the node, and (ii) a respective embedding of the edge set for the node; generating a context embedding for a next node in the ordering of the nodes using the embedding of the edge set for the node; and adding the set of edges defined by the edge set for the node to the graph.

26 Claims, 7 Drawing Sheets

(56) References Cited

OTHER PUBLICATIONS

Airoldi et al., "Mixed membership stochastic block models," Journal of Machine Learning Research, 2008, 34 pages.
Albert et al., "Statistical mechanics of complex networks," Reviews of Modern Physics, Jan. 2002, 74(1):1-54.
Ansótegui et al., "On the structure of industrial SAT instances," International Conference on Principles and Practice of Constraint Programming, Lisbon, Portugal, Sep. 20-24, 2009, Sep. 2009, 15 pages.
Barabási et al., "Emergence of scaling in random networks," Science, Oct. 1999, 286(5439):509-12.
Bojchevski et al., "NetGan: Generating graphs via random walks," International Conference on Machine Learning, Jul. 2018, 10 pages.
Bradbury et al., "Automatic batching as a compiler pass in PyTorch," Workshop on Systems for ML, Dec. 2018, 3 pages.
Brockschmidt et al., "Generative code modeling with graphs," Published as a Conference Paper at ICLR 2019, New Orleans, Louisana, USA, May 6-9, 2019, May 2018, 24 pages.
Chakrabarti et al., "R-MAT: A recursive model for graph mining," Proceedings of the 2004 SIAM International Conference on Data Mining, Lake Buena Vista, Florida, USA, Apr. 22-24, 2004, Apr. 2004, 5 pages.
Chen et al., "Training deep nets with sublinear memory cost," Machine Learning, Cornell University, arXiv preprint arXiv:1604.06174, Apr. 2016, 12 pages.
Clauset et al., "Power-law distributions in empirical data," SIAM Review, 2009, 51(4):1-43.
Dai et al., "Syntax-directed variational autoencoder for structured data," Published as a Conference Paper at ICLR 2018, Vancouver, Canada, Feb. 2018, 17 pages.
Dobson et al., "Distinguishing enzyme structures from non-enzymes without alignments," Journal of Molecular Biology, Jul. 2003, 330(4):771-783.
Fenwick et al., "A new data structure for cumulative frequency tables," Software: Practice and Experience, Mar. 1994, 24(3):327-336.
Jin et al., "Junction tree variational autoencoder for molecular graph generation," International Conference on Machine Learning, Stockholm, Sweden, Jul. 10-15, 2018, 10 pages.
Kingma et al., "Auto-encoding variational bayes," Machine Learning, Cornell University, arXiv preprint arXiv:1312.6114, Dec. 2013, 14 pages.
Kipf et al., "Variational Graph Auto-Encoders," Machine Learning, Cornell University, arXiv preprint arXiv:1611.07308, Nov. 2016, 3 pages.
Kusner et al., "Grammar variational autoencoder," International Conference on Machine Learning, Sydney, Australia, Aug. 6-11, 2017, 10 pages.
Leskovec et al., "Kronecker graphs: An approach to modeling networks," Machine Learning, Cornell University, arXiv preprint arXiv:0812.4905, Dec. 2008, 58 pages.
Li et al., "Learning Deep Generative Models of Graphs," Machine Learning, Cornell University, arXiv preprint arXiv:1803.03324, Mar. 2018, 21 pages.
Liao et al., "Efficient graph generation with graph recurrent attention networks," Machine Learning, Cornell University, arXiv preprint arXiv:1910.00760, Oct. 2019, 13 pages.
Liu et al., "Graph normalizing flows," Advances in Neural Information Processing Systems, 2019, 13 pages.
Liu et al., "Constrained graph variational autoencoders for molecule design," Advances in Neural Information Processing Systems, 2018, 13 pages.
Looks et al., "Deep learning with dynamic computation graphs," Published as a Conference Paper at 5th ICLR, Toulon, France, Apr. 24-26, 2017, 12 pages.
Mnih et al., "A scalable hierarchical distributed language model," Advances in Neural Information Processing Systems, 2008, 21:1-8.
Neubig et al., "On-the-fly operation batching in dynamic computation graphs," Machine Learning, Cornell University, arXiv preprint arXiv:1705.07860, May 2017, 13 pages.
Neumann et al., "Graph kernels for object category prediction in task-dependent robot grasping," Online Proceedings of the Eleventh Workshop on Mining and Learning with Graphs, 2013, 6 pages.
Newman, "Modularity and community structure in networks," Proceedings of the National Academy of Sciences, Jun. 2006, 103(23):8577-8582.
Newman, "Clustering and preferential attachment in growing networks," Physical review E., Jul. 2001, 64(2):1-13.
Robins et al., "An introduction to exponential random graph (p*) models for social networks," Social Networks, May 2007, 29(2):1-30.
Shi et al., "Graphaf: a flow-based autoregressive model for molecular graph generation," Published as a Conference Paper at ICLR 2020, Virtual Conference, Formerly Addis Ababa, Ethiopia, Apr. 26-May 1, 2020, Jan. 2020, 18 pages.
Simonovsky et al., "GraphVAE: Towards generation of small graphs using variational autoencoders," International Conference on Artificial Neural Networks, Rhodes, Greece, Oct. 4-7, 2018, 10 pages.
Tai et al., "Improved semantic representations from tree-structured long short-term memory networks," Computation and Language, Cornell University, arXiv preprint arXiv:1503.00075, Feb. 2015, 11 pages.
Vaswani et al., "Attention is all you need," Computation and Language, Cornell University, arXiv preprint arXiv:1706.03762, Jun. 2017, 15 pages.
Watts et al., "Collective dynamics of 'small-world' networks," Nature, Jun. 1998, 393(6684):440-442.
Xiao et al., "Transg: A generative model for knowledge graph embedding," Proceedings of the 54th Annual Meeting of the Association for Computational Linguistics, 2016, 1:2316-2325.
Xie et al., "Exploring randomly wired neural networks for image recognition," Proceedings of the IEEE/CVF International Conference on Computer Vision, Seoul, Korea, Oct. 27-Nov. 2, 2019, 10 pages.
You et al., "G2SAT: Learning to generate sat formulas," 33rd Conference on Neural Information Processing Systems (NeurIPS 2019), Vancouver, Canada, Dec. 8-14, 2019, 32:1-13.
You et al., "GraphRNN: Generating realistic graphs with deep auto-regressive models," International Conference on Machine Learning, Stockholm, Sweden, Jul. 10-15, 2018, 10 pages.

* cited by examiner

AUTOREGRESSIVE GRAPH GENERATION MACHINE LEARNING MODELS

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a graph generation system implemented as computer programs on one or more computers in one or more locations.

As used throughout this specification, a "graph" refers to a data structure that includes: (i) a set of nodes, and (ii) a set of edges. Each edge in the graph can connect a pair of nodes in the graph. The graph can be a "directed" graph, i.e., such that each edge that connects a pair of nodes is defined as pointing from the first node to the second node or vice versa, or an "undirected" graph, i.e., such that the edges are not associated with directions.

Data defining a graph can include data defining the nodes and the edges of the graph, and can be represented in any appropriate data format. For example, a graph can be defined by an adjacency matrix that includes a number of rows and a number of columns equal to the number of nodes in the graph. Each entry (i,j) in the adjacency matrix can have value 1 (or some other predefined value) if the graph includes an edge connecting node i and node j, and value 0 (or some other predefined value) otherwise. As another example, a graph can be defined by a set of tuples {(i,j)}, where each tuple (i,j) represents an edge in the graph connecting the node i and node j.

As used throughout this specification, an "embedding" refers to an ordered collection of numerical values, e.g., a vector, matrix, or other tensor of numerical values.

According to a first aspect, there is provided a method performed by one or more data processing apparatus for generating data defining a graph, wherein the graph comprises: (i) a plurality of nodes, and (ii) a plurality of edges that each connect a respective pair of nodes in the graph, the method comprising: determining a number of nodes in the graph; sequentially generating a respective edge set for each node in the graph starting from a first node in an ordering of the nodes in the graph, wherein the edge set for each node defines a set of edges in the graph corresponding to the node, wherein for each of a plurality of nodes after a first node in the ordering of nodes, generating the edge set for the node comprises: receiving a context embedding for the node that summarizes a respective edge set for each node that precedes the node in the ordering of the nodes; generating, based on the context embedding for the node: (i) a respective edge set for the node, and (ii) a respective embedding of the edge set for the node; generating a context embedding for a next node in the ordering of the nodes using the embedding of the edge set for the node; and adding the set of edges defined by the edge set for the node to the graph; and providing an output comprising the data defining the graph.

In some implementations, generating the context embedding for the next node in the ordering of the nodes using the embedding of the edge set for the node comprises: updating a first level of a hierarchical arrangement of embeddings in a plurality of levels by adding the embedding of the edge set for the node to the first level; propagating the update to the first level in the hierarchical arrangement of embeddings into each subsequent level in the hierarchical arrangement of embeddings; and generating the context embedding for the next node based on the updated hierarchical arrangement of embeddings.

In some implementations, for one or more subsequent levels, propagating the update to the first level in the hierarchical arrangement of embeddings into the subsequent level comprises: generating a new embedding by processing two or more embeddings from a preceding level in the hierarchical arrangement of embeddings using one or more neural network layers; and updating the subsequent level by adding the new embedding to the subsequent level.

In some implementations, for one or more subsequent levels, propagating the update to the first level in the hierarchical arrangement of embeddings into the subsequent level comprises: determining that the subsequent level should not be updated.

In some implementations, propagating the update to the first level in the hierarchical arrangement of embeddings into each subsequent level in the hierarchical arrangement of embeddings comprises: adding a new level that includes at least one new embedding to the hierarchical arrangement of embeddings.

In some implementations, a number of embeddings in each level of the hierarchical arrangement of embeddings decreases exponentially with each level in the hierarchical arrangement of embeddings.

In some implementations, generating the context embedding for the next node based on the updated hierarchical arrangement of embeddings comprises: selecting one or more embeddings from the updated hierarchical arrangement of embeddings, wherein the selected embeddings include at least one embedding from a level after the first level; and processing the selected embeddings using one or more neural network layers to generate the context embedding for the next node.

In some implementations, selecting one or more embeddings from the updated hierarchical arrangement of embeddings comprises: selecting the embeddings based on an index of the next node.

In some implementations, processing the selected embeddings using one or more neural network layers to generate the context embedding for the next node comprises: sequentially processing each selected embedding using one or more recurrent neural network layers.

In some implementations, generating the edge set for the node comprises: constructing a tree, conditioned on the context embedding for the node, that comprises one or more leaf vertices that each identify a respective target node in the graph; and determining that the graph includes a respective edge between: (i) the node, and (ii) each target node identified by a respective leaf vertex.

In some implementations, each vertex in the tree is associated with a respective interval of one or more node indices from a set of node indices that indexes the nodes in the graph, and wherein each child vertex is associated with an interval of node indices that is a proper subset of an interval of node indices associated with a parent vertex of the child vertex.

In some implementations, constructing the tree comprises: instantiating a root vertex in the tree; and for each vertex in the tree starting from the root vertex: determining if the vertex has each of multiple possible child vertices; and in response to determining that the vertex has a possible child vertex, recursively transitioning into the child vertex to generate a sub-tree rooted at the child vertex.

In some implementations, determining if the vertex has a possible child vertex comprises: processing one or more tree state embeddings associated with the vertex that collectively represent a current state of the tree using one or more neural network layers to generate a probability value; and probabilistically determining if the vertex has the possible child vertex based on the probability value.

In some implementations, the method further comprises conditioning the construction of the tree on the context embedding for the node by initializing one or more tree state embeddings associated with the root vertex in the tree based on the context embedding for the node.

In some implementations, generating the embedding of the edge set for the node comprises, after constructing the tree: determining the embedding of the edge set for the node based on one or more tree state embeddings generated for the root vertex of the tree.

In some implementations, the tree is a binary tree.

In some implementations, generating the edge set for the first node in the ordering of the nodes comprises: receiving a default context embedding; generating, based on the default context embedding for the first node: (i) a respective edge set for the first node, and (ii) a respective embedding of the edge set for the first node; generating a context embedding for a next node in the ordering of the nodes using the embedding of the edge set for the first node; and adding the set of edges defined by the edge set for the first node to the graph.

In some implementations, the graph represents a protein structure or a chip graph.

According to another aspect, there is provided a system comprising: one or more computers; and one or more storage devices communicatively coupled to the one or more computers, wherein the one or more storage devices store instructions that, when executed by the one or more computers, cause the one or more computers to perform operations to implement the techniques described herein.

According to another aspect, there are provided one or more non-transitory computer storage media storing instructions that when executed by one or more computers cause the one or more computers to perform operations to implement the techniques described herein.

Particular embodiments of the subject matter described in this specification can be implemented so as to realize one or more of the following advantages.

This specification describes a graph generation system that, in response to being "queried," can generate data defining new graphs. The graph generation system can be trained using machine learning training techniques to generate graphs from the same distribution as a set of training graphs. The training graphs can be, e.g., a set of chip graphs that each represent the logical operations implemented by a respective integrated circuit, or a set of protein graphs that each represent a respective protein structure. After being trained on a set of training graphs, the graph generation system can be used to generate new graphs for use in a variety of applications, as will be described in more detail below.

To generate the edges in a graph, the graph generation system sequentially traverses the nodes in the graph and generates a respective edge set for each node that defines a set of edges corresponding to the node. The graph generation system generates the edge sets autoregressively, i.e., by generating the edge set for each given node based on the edge sets of the nodes that precede the given node (i.e., in an ordering of the nodes in the graph). To facilitate the autoregressive generation of the edge sets, the system can maintain a hierarchy of embeddings in a set of levels. The first level of the hierarchy includes a respective embedding of each previously generated edge set, and each subsequent level of the hierarchy includes embeddings that are derived from the embeddings at the preceding level. Each time the system generates a new edge set, the system updates the first level of the hierarchy by adding an embedding of the new edge set to the first level, and then propagates the update to the first level into each subsequent level of the hierarchy. The system then processes one more embeddings from the hierarchy to generate a "context" embedding that is used to condition the generation of the edge set for the next node in the graph.

Conditioning the generation of the edge set for each node on the described hierarchy of embeddings can enable the graph generation system to efficiently and effectively integrate information from across previously generated edge sets, while also enabling efficient parallelization of operations during training of the graph generation system. For example, during training, the hierarchy of embeddings can be generated using parallel operations requiring only O(log n) synchronization stages (where n is the number of nodes in the graph), in contrast to other techniques for generating context embeddings that require, e.g., O(n) synchronization stages. Generating context embeddings using the described hierarchy of embeddings can thus enable the graph generation system to be trained on larger training graphs (e.g., that include more nodes) than would otherwise be feasible.

The system can generate the edge set for each node in the graph by autoregressively and recursively constructing an "edge" tree, conditioned on the context embedding for the node, that includes leaf vertices defining the edge set for the node. Constructing an edge tree provides a computationally efficient mechanism for the system to generate the edge set for a node, particularly when the edge set is sparse, because the system can adaptively terminate recursive construction of parts of the edge tree that are not relevant to the edge set. By constructing only those parts of the edge tree that are relevant to the edge set, the system can reduce consumption of computational resources (e.g., memory and computing power) during generation of the edge set. Generating edge sets for nodes using edge trees can also enable efficient parallelization of operations during training, as described in more detail below, thus enabling the graph generation system to be trained on larger training graphs than would otherwise be feasible.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
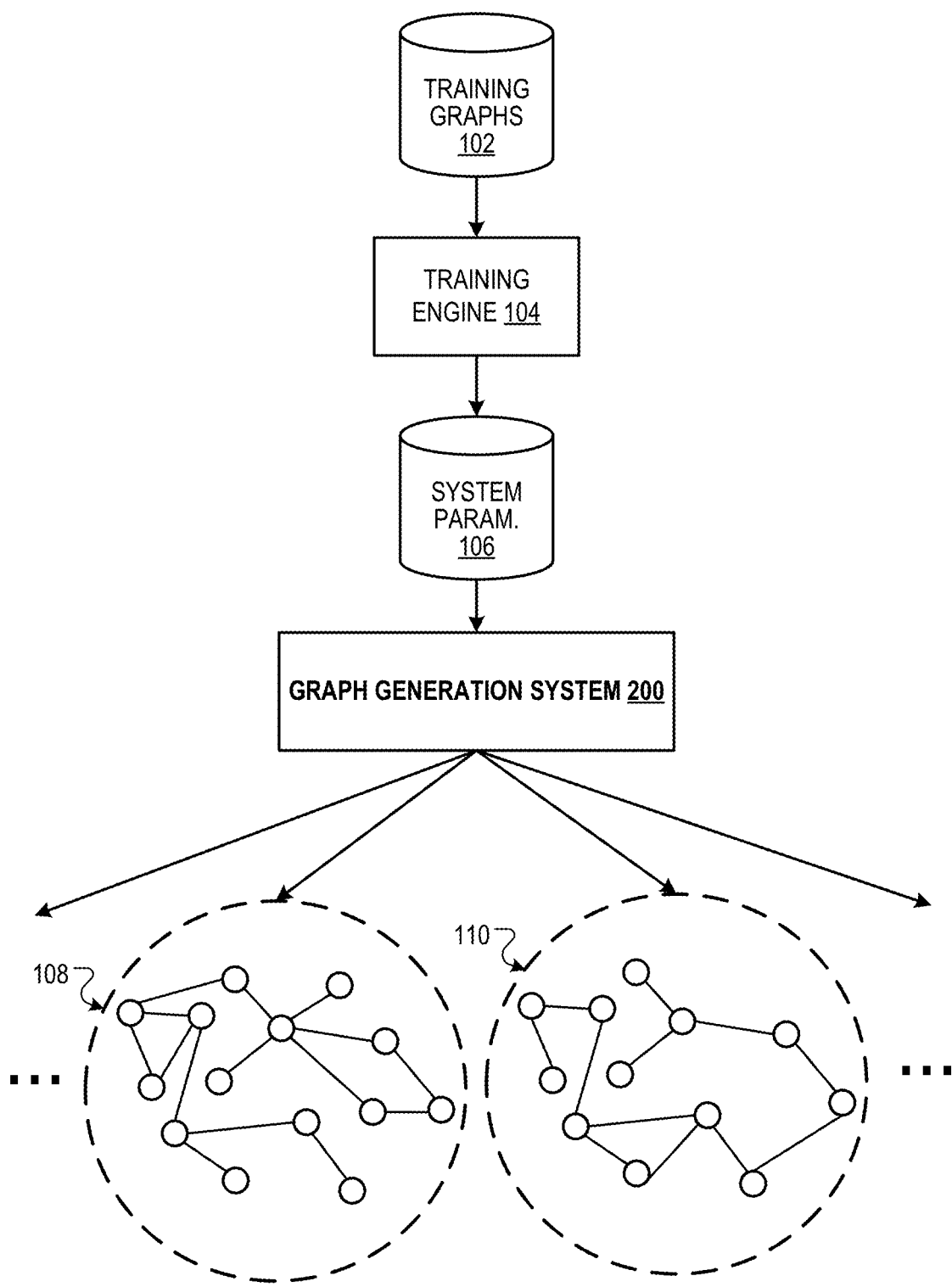
FIG. 1 is an illustration of an example environment including a graph generation system.

This specification describes a graph generation system 200 (e.g., as shown in FIG. 1) that, in response to being "queried," can generate data defining a graph, e.g., the graph 108 or the graph 110. The graph generation system 200 can be queried any appropriate number of times, e.g., 1 time, 10 times, 1000 times, or 1,000,000 times. The graph generation system 200 uses a probabilistic procedure to generate graphs (i.e., a procedure that involves some randomness), and in general, can generate data defining a different graph in response to each query.

The graph generation system 200 has a set of trainable parameters 106, and is configured to generate graphs in accordance with the values of the set of parameters 106. The graph generation system parameters 106 can be, e.g., neural network parameters that define neural network operations that are performed by the graph generation system 200, as will be described in more detail below.

A training engine 104 can train the graph generation system parameters 106 based on a set of training graphs 102, e.g., that are provided by a user of the graph generation system 200. In particular, the training engine 104 can train the graph generation system 200 to learn to generate new graphs that are drawn from the same distribution (i.e., over the space of possible graphs) as the set of training graphs 102. Example techniques for training the graph generation system 200 on a set of training graphs 102 are described in more detail below.

The graphs generated by the graph generation system 200 can be used for any of a variety of purposes. A few non-limiting examples of possible applications of the graph generation system 200 are described next.

In some implementations, each training graph 102 can be a "chip graph" representing the logical operations implemented by a respective integrated circuit. More specifically, each node in a chip graph can representing a logical operation (e.g., an AND, OR, NOT, or XOR operation), and the edges connecting the nodes can define the routing of inputs to and outputs of the logical operations represented by the nodes. The training engine 104 can train the graph generation system 200 to generate new graphs that are drawn from the same distribution as the provided training set of chip graphs. Thus, the new graphs generated by the graph generation system 200 can be understood as being "synthetic" chip graphs.

The synthetic chip graphs generated by the graph generation system 200 can be used, e.g., to generate training data for training a "chip placement" machine learning model, e.g., as described with reference to: Azalia Mirhoseini et al.: "Chip placement with deep reinforcement learning," arXiv: 2004.10746v1, 22 Apr. 2020.

The number of "real" chip graphs, i.e., representing real integrated circuits, that are available to train the chip placement machine learning model may be limited, e.g., numbering in only the tens or hundreds. The graph generation system 200 can be used to generate an unlimited number of synthetic chip graphs, drawn from approximately the same distribution as the real chip graphs, that can be used to dramatically augment the amount of training data available for training the chip placement machine learning model.

In some implementations, each training graph 102 can be a "protein graph" representing a structure of a respective protein. More specifically, each node in a protein graph can represent a respective amino acid in a protein, and each edge connecting a pair of nodes in the protein graph can represent a spatial proximity between a corresponding pair of amino acids in the protein. For example, a protein graph can include a respective edge connecting any pair of nodes that represent a pair of amino acids that are separated by a distance of less than 8 Angstroms (or any other appropriate distance) in the structure of the protein. The training engine 104 can train the graph generation system 200 to generate new graphs that are drawn from the same distribution as the provided training set of protein graphs. Thus, the new graphs generated by the graph generation system 200 can be understood as representing "synthetic" protein structures.

The synthetic protein structures generated by the graph generation system 200 can be used, e.g., to facilitate drug discovery. For example, the training engine 104 can train the graph generation system 200 on a collection of protein graphs representing protein structures of proteins that are known to have desirable properties, e.g., therapeutic properties. The "synthetic" protein structures generated by the graph generation system 200, which are drawn from the same distribution as the training set of protein structures of desirable proteins, can be candidates for further analysis as potential new drugs.

In some implementations, each training graph 102 can be an "object graph" that defines a mesh representation of a three-dimensional (3-D) object, e.g., a triangular or quadrilateral mesh representation of a 3-D object. More specifically, each node in an object graph can represent a respective node in a mesh, and each edge in an object graph can represent an edge in the mesh, i.e., such that the object graph directly defines the mesh. The training engine 104 can train the graph generation system 200 to generate new graphs that are drawn from the same distribution as the provided training set of object graphs. Thus, the new graphs generated by the graph generation system 200 can be understood as representing "synthetic" meshes representing new objects. The synthetic objects generated by the graph generation system 200 can be used, e.g., to facilitate dynamical computer graphics, e.g., in a video game environment. For example, the training engine 104 can train the graph generation system 200 on a collection of object graphs representing people. The synthetic objects generated by the graph generation system 200, which are drawn from the same distribution as the training set of meshes representing people, can define mesh representations of new people, e.g., that can be dynamically displayed in a video game environment.

In some implementations, the graph generation system 200 can be conditioned on data defining desired properties of the graphs to be generated by the graph generation system. For example, the graph generation system can generate protein graphs corresponding to proteins that are predicted to have desired properties (e.g., therapeutic properties) after being conditioned on data specifying the desired properties.

In some implementations, the graph generation system 200 can be used to perform graph completion, i.e., to receive an input that defines a partial graph (e.g., a partial object graph) and to generate an output graph that defines a completion of the partial graph.

In some implementations, the graph generation system 200 can be configured to generate both: (1) a graph, and (2) an embedding of the graph. After generating a graph, the graph generation system can generate an embedding for the graph, e.g., using the context embedding system described with reference to FIG. 3. The embedding for a graph can implicitly represent properties and features of the graph. A separate graph embedding machine learning model can be trained, e.g., to process a representation of a graph generated by the graph generation system 200 to generate as output an embedding that matches the corresponding graph embedding generated by the graph generation system 200. Subsequently, graph embeddings generated by the graph embedding machine learning model (including for graphs other than those generated by the graph generation system) can be processed by downstream machine learning models that generate predictions characterizing graphs, e.g., classification or regression predictions.

Figure 2:
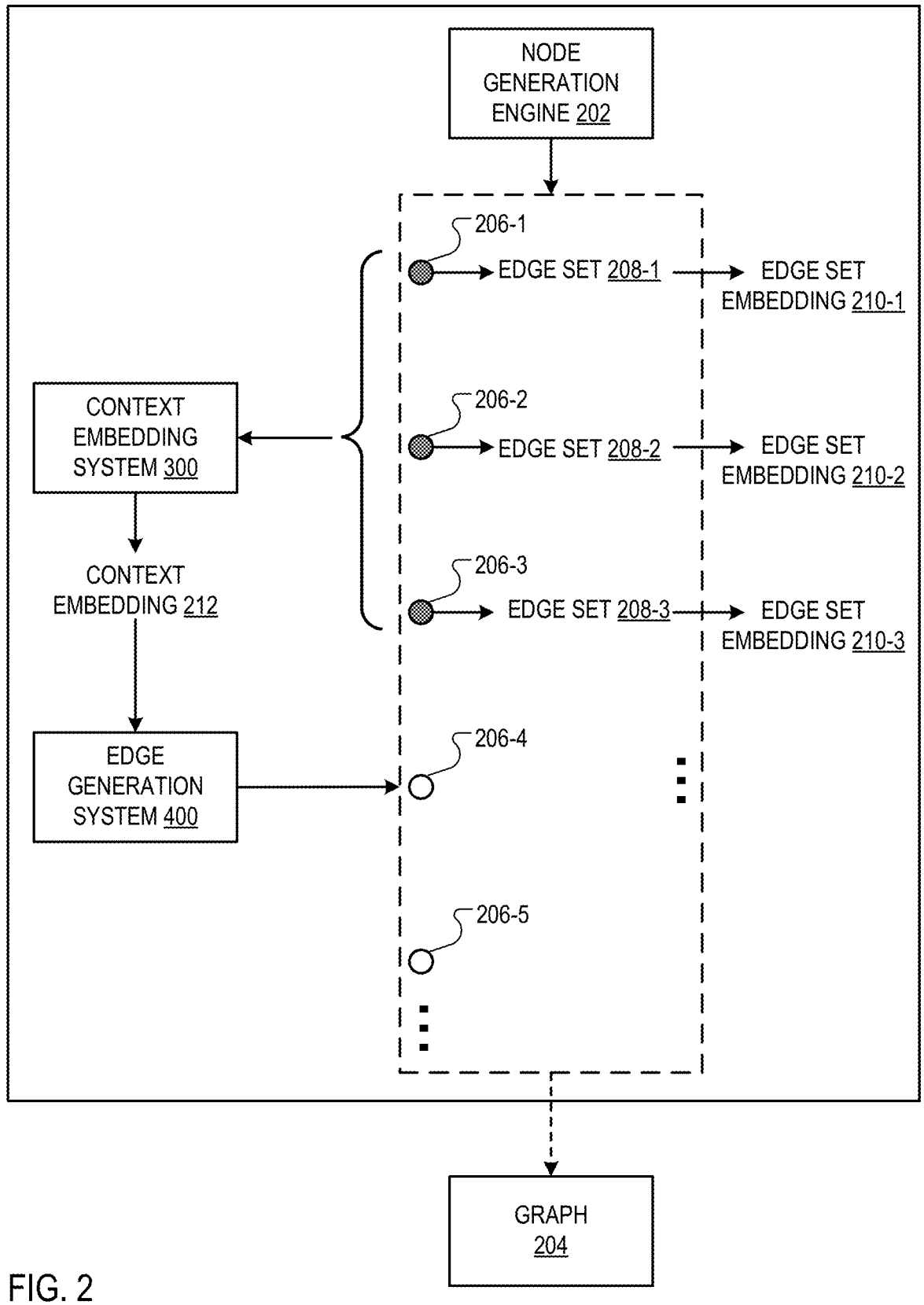
FIG. 2 shows an example graph generation system.

FIG. 2 shows an example graph generation system 200. The graph generation system 200 is an example of a system implemented as computer programs on one or more computers in one or more locations in which the systems, components, and techniques described below are implemented.

The graph generation system 200 is configured to generate a graph 204 in response to receiving a "query," i.e., a request (e.g., from a user) for a new graph 204.

The graph generation system 200 generates the graph 204 using a node generation engine 202, a context embedding system 300, and an edge generation system 400, which are each described in more detail next.

The node generation engine 202 can determine the number of nodes in the graph 204, e.g., by sampling a from a predefined probability distribution over a set of positive integer values, e.g., {1, 2, . . . , 5000}. The probability distribution over the number of nodes in the graph 204 can be determined during training, e.g., as the empirical distribution over the number of nodes in the training graphs used to train the graph generation system 200. Alternatively, a user of the graph generation system 200 can provide an input that specifies the number of nodes to be included in the graph 204.

The graph generation system 200 can associate the nodes in the graph with an arbitrary "ordering," i.e., such that each if the graph includes N nodes, then the nodes in the graph are understood as being indexed by {1, . . . , N}.

In FIG. 2, nodes in the graph 204 are illustrated by circles, e.g., the circles 206-1-206-6, where 206-1 is the first node in the ordering of the nodes, 206-2 is the second node in the ordering of the nodes, and so on.

The graph generation system 200 uses the context embedding system 300 and the edge generation system 400 to generate an "edge set," e.g., the edge sets 208-1, 208-2, 208-3, and so on, for each node in the graph 204. The edge set for a node defines a set of edges in the graph 204 that correspond to the node. For example, in a directed graph, the edge set for a node can represent the set of "outgoing" edges from the node (i.e., each edge pointing away from the node), or the set of "incoming" edges into the node (i.e., each edge pointing into the node). In some cases, the edge set for a node can be empty, i.e., if the graph 204 does not include any edges corresponding to the node. In some cases, the edge set for a node can be "sparse," i.e., the number of edges corresponding to the node can be significantly less than the number of nodes in the graph 204.

As part of generating the edge set for a node, the graph generation system 200 also generates an edge set embedding for the node, i.e., an embedding representing the edge set for the node.

The graph generation system 200 generates the edge sets (and edge set embeddings) for the nodes in the graph sequentially, i.e., by generating the edge sets (and the edge set embeddings) for the nodes in accordance with the ordering of the nodes in the graph. That is, the graph generation system 200 first generates the edge set 208-1 and edge set embedding 210-1 for the first node 206-1, then generates the edge set 208-2 and the edge set embedding 210-2 for the second node 206-2, then generates the edge set 208-3 and the edge set embedding 210-3 for the third node 206-3, and so on.

Further, the graph generation system 200 generates the edge sets (and the edge set embeddings) for the nodes in the graph autoregressively. More specifically, for each given node after the first node in the graph, the graph generation system 200 generates the edge set and the edge set embedding for the given node based on the edge set embeddings of some or all of the nodes that precede the given node (i.e., in the ordering of the nodes in the graph). Generally, the edge set for a given node does not depend on the edge set embeddings for any nodes that follow the given node, because the edge set embeddings for the following nodes have not yet been generated when the system generates the edge set for the given node. Generating the edge sets for the nodes in the graph autoregressively can enable the graph generation system 200 to generate a more coherent graph, e.g., that more accurately reflects the distribution of graphs that the graph generation system 200 is trained to represent.

To generate the edge set for a given node after the first node, the graph generation system 200 uses the context embedding system 300 to generate a context embedding 212 based on the respective edge set embeddings of some or all of the nodes that precede the given node. Thus, the context embedding 212 for a given node implicitly characterizes the respective edge sets of some or all of the nodes that precede the given node. In the illustration provided by FIG. 1, the context embedding system 300 generates the context embedding 212 for node 206-4 by processing the edge set embeddings 210-1-210-3 corresponding to nodes 206-1 to 206-3 respectively.

The context embedding system 300 can generate the context embedding 212 for a given node based on the edge set embeddings for some or all of the previous nodes in any of a variety of possible ways. For example, the context embedding system 300 can generate the context embedding for a given node by aggregating, e.g., summing or averaging the edge set embeddings for the preceding nodes. As another example, the context embedding system 300 can generate the context embedding for a given node as the output of a recurrent neural network, e.g., a long short-term memory (LSTM) neural network, as a result of sequentially processing the edge set embeddings for the preceding nodes.

In some cases, generating the context embedding 212 for a given node using an aggregation operation (e.g., by summing the preceding edge set embeddings) or using a recurrent neural network (e.g., by processing the preceding edge embeddings using an LSTM) can result in significant loss of information. For example, an aggregation operation can be dominated by particularly large component values in the edge set embeddings, and the LSTM can "forget"

information from earlier edge set embeddings, particularly if there are a large number of preceding nodes (e.g., hundreds or thousands of preceding nodes). To address these potential issues, the context embedding system 300 can generate the context embedding for each node by constructing and iteratively updating a hierarchy of embeddings based on the edge set embeddings of the preceding nodes, as will be described in more detail with reference to FIG. 3.

The context embedding system 300 can generate the context embedding 212 for the first node in the graph in any appropriate manner. For example, the context embedding system 300 can generate the context embedding 212 for the first node in the graph as a default embedding (e.g., an embedding of all zeros), or a random embedding (e.g., where each component of the embedding is sampled from a predefined probability distribution).

The edge generation system 400 processes the context embedding 212 for a given node to generate the edge set and the edge set embedding for the given node. The edge generation system 400 can generate the edge set and the edge set embedding for a given node in any of a variety of possible ways. For example, the edge generation system 400 can process the context embedding 212 for a given node using one or more neural network layers, e.g., fully-connected neural network layers, to generate a vector that defines the edge set for the given node. A vector representing the edge set for a given node can include a respective component for each node in the graph, where component i can have value 1 (or some other predefined value) if the given node is connected to node i by an edge, and component i can have value 0 (or some other predefined value) otherwise. In this example, the vector defining the edge set for the given node can also represent the edge set embedding for the given node.

In some cases, generating the edge set for a node as a direct output of one or more neural network layers can be computationally inefficient, e.g., if the edge set for the node is sparse, and if the graph includes a large number of nodes (e.g., thousands of nodes). In this example, the edge generation system 400 may perform computationally intensive neural network operations to generate a high-dimensional output (e.g., with thousands of dimensions) that serves only to represent the existence of a small number of edges. To address these potential issues, the edge generation system 400 can generate the edge set for each node by constructing a tree that represents a hierarchical recursive decomposition of the set of possible edges in the edge set, as will be described in more detail with reference to FIG. 4.

The graph generation system 200 continues autoregressively generating the respective edge set for each node in the graph until the final node in the graph, and then outputs data defining the resulting graph 204 that includes each node and the respective edge set corresponding to each node. The graph 204 can be used for any of a variety of purposes. For example, the graph 204 can be a synthetic chip graph that is used to augment a set of training data for training a chip placement machine learning model, or a protein graph that used to facilitate drug discovery, as described above.

Generally, some of the operations performed by the graph generation system 200 involve randomness, thereby enabling the graph generation system 200 to generate a different graph 204 each time the graph generation system 200 is queried. For example, the graph generation system 200 can inject randomness into the generation of the context embedding 212 for the first node (as described above), or into the generation of the respective edge set for each node (e.g., as will be described in more detail with reference to FIG. 4).

Figure 3:
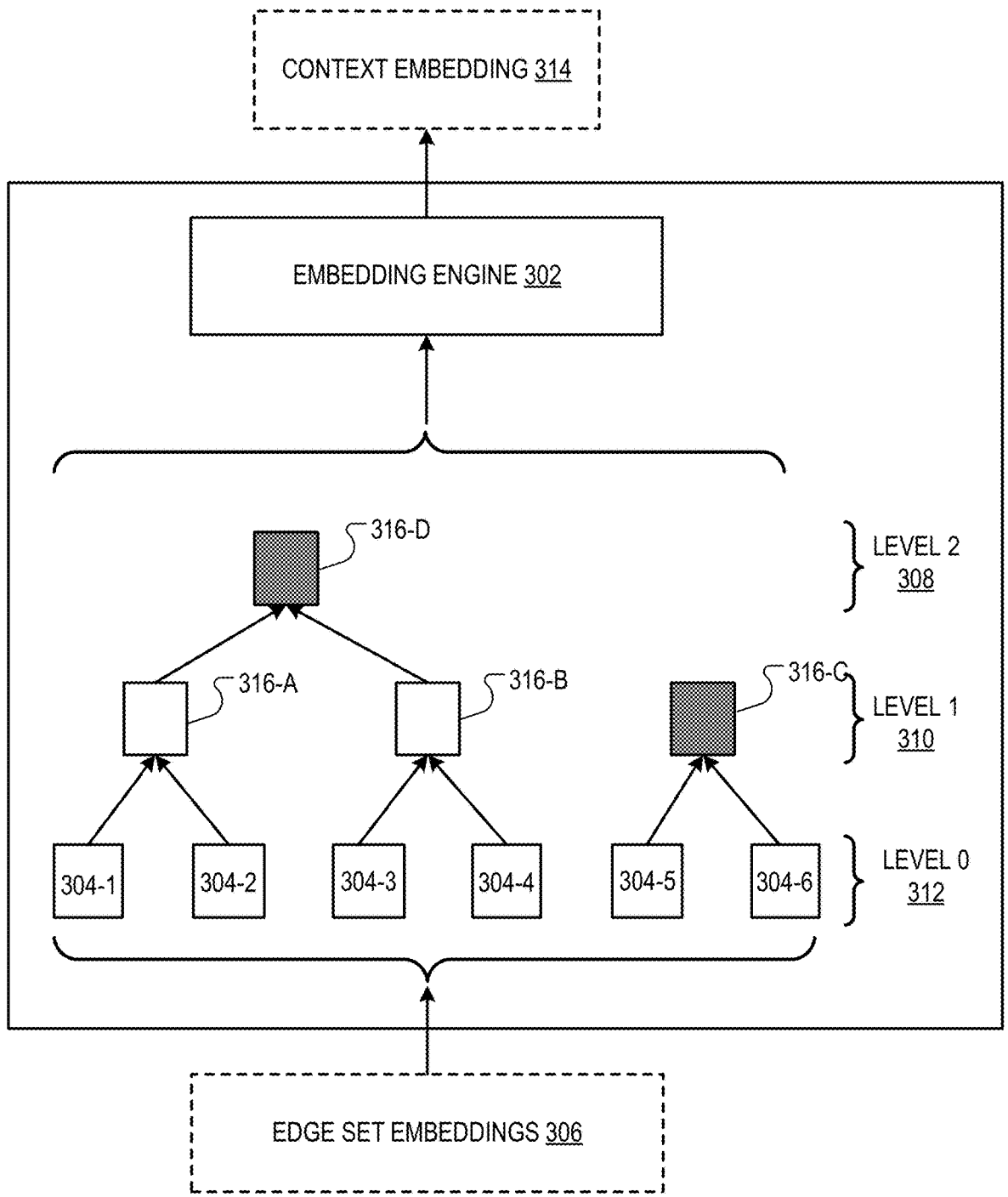
FIG. 3 shows an example context embedding system.

FIG. 3 shows an example context embedding system 300. The context embedding system 300 is an example of a system implemented as computer programs on one or more computers in one or more locations in which the systems, components, and techniques described below are implemented.

The context embedding system 300 is configured to generate a respective context embedding 314 for each given node in the graph based on a respective edge set embedding 306 for each node that precedes the given node in the ordering of the nodes in the graph.

To generate the context embedding 314 from the edge set embeddings 306, the context embedding system 300 constructs a hierarchical collection of embeddings that includes: (i) a respective edge set embedding 306 for each node that precedes the given node (e.g., the edge set embeddings 304-1-304-6), and (ii) a set of "intermediate" embeddings (e.g., 316-A-316-D) that are derived from the edge set embeddings 306.

The collection of embeddings is organized hierarchically, i.e., such that each embedding is associated with a "level" in the hierarchy (e.g., level 0 (312), level 1 (310), level 2 (308), etc.). Each edge set embedding 306 is associated with level 0 in the hierarchy, and each intermediate embedding is associated with a higher level in the hierarchy (e.g., level 1 (310), level 2 (308), etc.). Each intermediate embedding in a given level in the hierarchy is generated by combining two or more embeddings from the preceding level in the hierarchy, e.g., using one or more neural network layers.

For example, intermediate embedding 316-A in level 1 is generated by combining edge set embeddings 304-1 and 304-2 from level 0, intermediate embedding 316-B in level 1 is generated by combining edge set embeddings 304-3 and 304-4 from level 0, intermediate embedding 316-C in level 1 is generated by combining edge set embeddings 304-5 and 304-6 from level 0, and intermediate embedding 316-D in level 2 is generated by combining intermediate embeddings 316-A and 316-B from level 1. That is, the context embedding system can generate intermediate embedding $g^i_j$ at index j in level i of the hierarchy as:

$$g^i_j = f(g^{i-1}_{j \cdot 2 - 1}, g^{i-1}_{j \cdot 2}) \quad (1)$$

where $g^{i-1}_{j \cdot 2 - 1}$ is the embedding at index j·2−1 in level i−1, $g^{i-1}_{j \cdot 2}$ is the embedding at index j·2 in level i−1, j ∈ {1, . . . , floor(m/$2^i$)} (where m is the number of edge set embeddings in level 0), and f(•) denotes the operations of one or more neural network layers, e.g., a TreeLSTM cell, as described with reference to: Tai, K. S. et al., "Improved semantic representations from tree-structure long short-term memory networks," arXiv:1503.00075, (2015).

More generally, each intermediate embedding at each level in the hierarchy can depend on any appropriate number of embeddings at the preceding level in the hierarchy, e.g., two (2) embeddings, three (3) embeddings, or (4) embeddings.

Typically, the number of embeddings decreases in each level of the hierarchy. For example, the number of embeddings in each level i of the hierarchy can be given by floor(m/$2^i$), where m is the number of edge set embeddings in level 0 of the hierarchy.

The context embedding system 300 iteratively constructs the hierarchical collection of embeddings by adding edge set embeddings to level 0 of the hierarchy, and then optionally generating new intermediate embeddings at each of one or more subsequent levels of the hierarchy. For example, the context embedding system 300 can start by adding the edge set embedding 304-1 for the first node in the graph to level 0. The context embedding system 300 can then add the edge set embedding 304-2 for the second node in the graph to level 0, and also generate the intermediate embedding 316-A from the edge set embeddings 304-1 and 304-2 and then add the intermediate embedding 316-A to level 1.

An example algorithm for updating the current hierarchy of embeddings $\mathcal{G}_{u-1}$ by updating the first level in the hierarchy by adding an edge set embedding $g_u^0$ for node u to the first level, and then propagating the update to the first level into each subsequent level in the hierarchy, is described next:

```
function update(u, 𝒢_{u−1}, g_u^0)
  𝒢_u ← 𝒢_{u−1} ∪ {g_u^0}
  for i ← 0 to floor(log(u − 1)) do
    j ← argmax_j 𝕀 [g_j^i ∈ 𝒢_u]
    if such j exists and j is an even number then g_{j/2}^{i+1} ← TreeCell(g_{j−1}^i, g_j^i)

𝒢_u ← 𝒢_u ∪ g_{j/2}^{i+1} end if
  end for
end function
``` where $\mathbb{I}[\cdot]$ is an indicator function that returns 1 when its argument is "true" and 0 otherwise, $$g_{j/2}^{i+1}$$

denotes an intermediate embedding at index j/2 in level i+1, and TreeCell(•,•) refers to neural network operations implemented by a TreeLSTM cell. The context embedding system 300 iteratively constructs the hierarchy of embeddings by repeatedly calling the update function described above.

To generate the context embedding 314 for a given node, the context embedding system 300 constructs a hierarchy of embeddings based on the respective edge set embedding for each node that precedes the given node (as described above). The context embedding system 300 then uses an embedding engine 302 to process one or more embeddings from the hierarchy of embeddings, e.g., using one or more neural network layers, to generate the context embedding 314 for the given node. For example, the context embedding system 300 can generate the context embedding $h_u$ for node u as:

$$h_u = LSTM\left(\left[g_{floor(u/2^i)}^i, \text{ where } u \, \& \, 2^i = 2^i\right]\right) \quad (2)$$

where LSTM(•) denotes an LSTM cell that consecutively processes embedding $$g_{floor(u/2^i)}^i$$

at index floor $$\left(\frac{u}{2^i}\right)$$

in level i, where & is the bit-level 'and' operator. In the example hierarchy of embeddings illustrated with reference to FIG. 3, the embedding engine can determine the context embedding 314 as the output generated by an LSTM cell by sequentially processing intermediate embeddings 316-C and 316-D.

Optionally, the context embedding system 300 can add a position encoding embedding to the context embedding generated for a node, e.g., that represents the node index of the node. An example technique for generating a position encoding embedding is described with reference to: Vaswani, A. et al., "Attention is all you need," in *Advances in Neural Information Processing Systems*, pp. 5998-6008, (2017).

In some implementations, the context embedding system 300 maintains and iteratively updates the hierarchy of embeddings throughout the process of generating context embeddings for each node in the graph, i.e., rather than reconstructing the entire hierarchy of embeddings each time a new context embedding 314 is generated. That is, to generate the context embedding 314 for a given node, the context embedding system 300 updates the existing hierarchy of embeddings using the edge set embedding for the previous node, and then processes one or more embeddings from the updated hierarchy of embeddings using the embedding engine 302. By maintaining and iteratively updating the hierarchy of embeddings, the context embedding system 300 can reduce the number of operations required to generate the context embedding 314 for each node, e.g., as compared to repeatedly reconstructing the entire hierarchy of embeddings.

By using the described hierarchy of embeddings, the context embedding system 300 can learn to generate context embeddings 314 that efficiently integrate information from across the set of previously generated edge set embeddings. In particular, the context embedding system 300 enables information from across the set of previously generated edge set embeddings to be combined and integrated more effectively than, e.g., directly summing the edge set embeddings. By processing the edge set embeddings hierarchically, the context embedding system 300 obviates issues that may arise from processing the edge set embeddings in linear order, e.g., using an recurrent neural network that can "forget" information while processing a long sequence of edge set embeddings. Generating the context embeddings using a hierarchy of embeddings can also enable efficient parallelization of operations during training of the graph generation system, as will be described in more detail with reference to FIG. 6.

Figure 4:
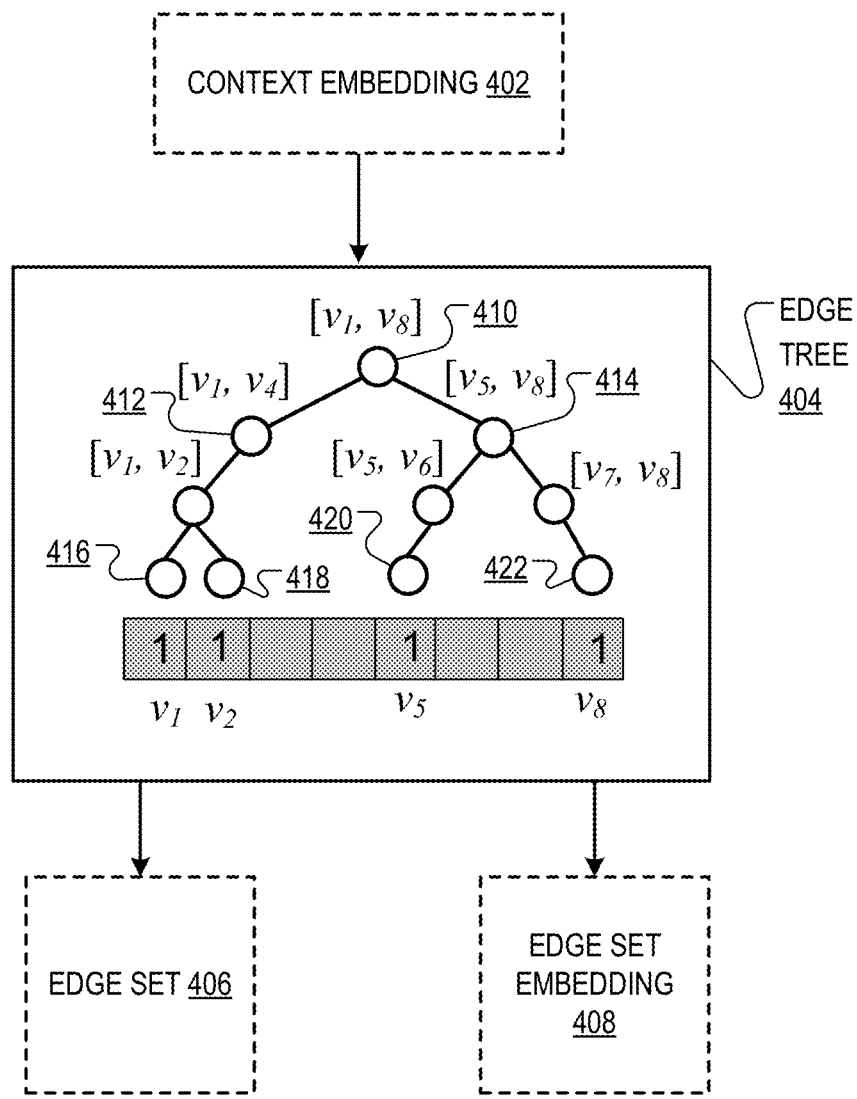
FIG. 4 shows an example edge generation system.

FIG. 4 shows an example edge generation system 400. The edge generation system 400 is an example of a system implemented as computer programs on one or more computers in one or more locations in which the systems, components, and techniques described below are implemented.

The edge generation system 400 processes a context embedding 402 for a "current" node in the graph (e.g., that summarizes the edge set embeddings for the preceding nodes in the graph) to generate: (i) an edge set 406, and (ii) an edge set embedding 408, for the current node. The edge set 406 for the current node defines a set of edges corresponding to the current node in the graph, e.g., a set of outgoing edges from the current node, or a set of incoming edges to the current node. The edge set embedding 408 is an embedding that represents the edge set 406.

To generate the edge set 406 and the edge set embedding 408, the edge generation system 400 generates data defining an "edge tree" 404. Generally, a tree is a connected acyclic undirected graph, i.e., that includes a set of vertices and a set of undirected edges that each connect a pair of vertices, where each vertex is connected to each other vertex by a path in the tree, and where the tree does not include any cycles. Other than a vertex designated as the "root" vertex, each given vertex in the tree is associated with a "parent" vertex, i.e., that is along a unique direct path from the given vertex to the root vertex. Each given vertex in the tree can optionally have one or more "child" vertices, i.e., vertices other than the parent vertex that are connected to the given vertex by an edge. A "leaf" vertex in the tree refers to a vertex that does not have any child vertices.

In the example edge tree 404 shown in FIG. 4, vertex 410 is the root vertex, and has child vertices 412 and 414. For illustrative purposes, the example edge tree 404 shown in FIG. 4 is a "binary" tree, i.e., where each vertex has at most two child nodes, but more generally, the edge tree 404 is not limited to being a binary tree, e.g., the edge tree 404 could be implemented as an n-ary tree where each vertex has at most n child nodes. The vertices 416, 418, 420, and 422 in the example tree shown in FIG. 4 are leaf vertices.

Each vertex in the edge tree is associated with a node index interval, i.e., an interval in the set $\{1, \ldots, N\}$ where N is the number of nodes in the graph. In particular, the root vertex is associated with node index interval [1, N], and each child vertex in the tree is associated with a node index interval that is a proper subset of the node index interval of its parent vertex. In the example edge tree 404 shown in FIG. 4, the graph includes 8 nodes, the root vertex 410 is associated with the node index interval [1,8], the left child vertex 412 of the root vertex is associated with the node index interval [1,4], the right child vertex 414 of the root vertex is associated with the node index interval [5,8], and so on. More generally, in an n-ary tree, the root vertex in the tree can be associated with node index interval [1, N] (where N is the number of nodes in the graph), and for each other vertex in the tree that is associated with a node index interval that includes more than one index, each child of the vertex can be associated with a node index interval from a partition of the node index interval of the parent into n intervals.

Each leaf vertex in the edge tree 404 that is associated with a node index interval of length 1, i.e., a node index interval that includes only a single node index, defines a respective edge in the edge set. For example, each leaf vertex in the tree that is associated with a single node index v can define an outgoing edge from the current node to node v, or an incoming edge from node v into the current node. In the example edge tree 404 shown in FIG. 4, the leaf nodes 416, 418, 420, and 422 are respectively associated with node indices 1, 2, 5, and 8, and can define, e.g., that the current node is connected by a respective outgoing or incoming edge to each of the nodes indexed by 1, 2, 5, and 8.

Thus the edge tree 404, once constructed, defines the edge set 406 for the input node. In particular, each leaf node in the edge tree 404 that is associated with a single node index defines a corresponding edge in the edge set 406. (The other nodes in the edge tree, i.e., that are not leaf nodes associated with a single node index, do not directly define edges in the edge set). The edge generation system 400 can condition the construction of the edge tree 404 on the context embedding 402, as will be described in more detail below.

The edge generation system 400 can incrementally construct the edge tree 404, e.g., by following a depth-first or in-order traversal order. For example, if the edge tree 404 is a binary tree, then starting at the root vertex and recursively for each vertex t, the edge generation system 400 determines if vertex t has a left child vertex (denoted lch(t)), and if so, transitions into lch(t) and generates the left sub-tree of vertex t. The edge generation system 400 then determines if vertex t has a right child vertex (denoted rch(t)), and if so, transitions into rch(t) and generates the right sub-tree of vertex t. The edge generation system 400 then transitions back to the parent of vertex t, unless vertex t is the root vertex, in which case the process of constructing the edge tree 404 terminates.

More generally, the edge tree 404 can be an n-ary tree, and the edge generation system 400 can construct the tree by, starting at the root vertex and for each vertex t, sequentially determining if vertex t has each of n possible child vertices, and if so, recursively transitioning into each child vertex to generate the sub-tree rooted at the child vertex.

The edge generation system 400 can generate the edge tree 404 autoregressively. That is, to determine whether a given vertex t has a specified child vertex, the edge generation system 400 can process one or more "tree state" embeddings associated with vertex t that collectively represent the current state of the edge tree 404, i.e., that represent the collection of vertices included in the current edge tree 404. More specifically, to determine whether a given vertex t has a specified child vertex, the edge generation system 400 processes the tree state embeddings representing the current state of the edge tree 404 using one or more neural network layers to generate a probability value, e.g., in the range [0,1]. The edge generation system 400 then probabilistically determines whether vertex t has the specified child vertex in accordance with the probability value. For example, the edge generation system 400 can sample a Bernoulli random variable parameterized by the probability value, and determining that vertex t has the specified child vertex if only if the sampled Bernoulli random variable has value 1.

In some implementations, the edge tree 404 is a binary tree, then the edge generation system can determine the probability p(lch(t)) that vertex t has a left child vertex and the probability p(rch(t)) that vertex t has a right child vertex as:

$$p(\text{lch}(t)) = \sigma(W_l h^{top}(t) + b_l) \quad (3)$$

$$p(\text{rch}(t)) = \sigma(W_r \hat{h}^{top}(\text{rch}(t)) + b_r) \quad (4)$$

where $\sigma(\cdot)$ denotes the sigmoid function, $W_l$, $b_l$, $W_r$, and $b_r$ are learned neural network parameter values, $h^{top}(t)$ is a tree state embedding representing the current state of the edge tree at the point when the edge generation system 400 determines if vertex t has a left child vertex, and $\hat{h}^{top}(\text{rch}(t))$ is a tree state embedding representing the current state of the edge tree at the point when the edge generation system determines if vertex t has a right child vertex. (Example techniques for determining $h^{top}(t)$ $\hat{h}^{top}(\text{rch}(t))$ are described below).

The edge generation system 400 can autoregressively generate the tree state embeddings characterizing the current state of the edge tree as part of the process of recursively building the edge tree. For example, if the edge tree is a binary tree and the edge generation system determines the existence of left and right child vertices in accordance with equations (3)-(4) above, then edge generation system 400 can recursively generate tree state embeddings $h^{bot}(t)$, $h^{top}(lch(t))$, $\hat{h}^{top}(rch(t))$, and $h^{top}(rch(t))$, where t is a vertex, as:

$$h^{bot}(t) = \text{TreeCell}^{bot}(h^{bot}(lch(t)), h^{bot}(rch(t))) \quad (5)$$

$$h^{top}(lch(t)) = \text{LSTMCell}(h^{top}(t), \text{embed}(\text{left})) \quad (6)$$

$$\hat{h}^{top}(rch(t)) = \text{TreeCell}^{top}(h^{bot}(lch(t)), h^{top}(lch(t))) \quad (7)$$

$$h^{top}(rch(t)) = \text{LSTMCell}(\hat{h}^{top}(rch(t)), \text{embed}(\text{right})) \quad (8)$$

where $\text{TreeCell}^{bot}(\bullet,\bullet)$ and $\text{TreeCell}^{top}(\bullet,\bullet)$ are two TreeLSTM cells that combine information from the incoming vertices into a single tree state embedding, and embed(left) and embed(right) represent an embedding vector for binary values "left" and "right." Optionally, the edge generation system 400 can add a position encoding embedding to each tree state embedding of each vertex, e.g., that represents the length of the node index interval associated with the vertex.

The edge generation system 400 can condition the generation of the edge tree 404 on the context embedding 402 by initializing a tree state embedding corresponding to the root vertex of the edge tree 404 based on the context embedding 402. For example, with reference to equations (5)-(8), the edge generation system 400 can initialize the tree state embedding $h^{top}(\text{root})$ for the root vertex to be the context embedding 402, thus conditioning the generation of the edge tree on the context embedding 402. The edge generation system 400 can initialize the tree state embedding $h^{bot}(\text{root})$ for the root vertex as 0 (i.e., as a vector of zeros).

An example of a recursive algorithm recursive(t, $h^{top}(t)$) that can be implemented by the edge generation system 400 to generate a binary edge tree using equations (3)-(8) is described next. The edge generation system 400 can trigger the generation of the edge tree 404 by calling recursive(t, $h^{top}(t)$) with argument t equal to the index of the root vertex of the tree and argument $h^{top}(t)$ equal to the context embedding 402. Calling the function then initiates a sequence of recursive function calls that iteratively builds the entire edge tree.

--- function recursive(t, $h^{top}(t)$)
    if isleaf(t)then
        Return 1, vertex index t
    end if
    hasleft~p(lch(t)|$h^{top}(t)$) using Eq. (3)
    if hasleft then
        Create lch(t), and let $h^{bot}(lch(t))$, $\mathcal{N}^{l,t}$ ← recursive (lch(t), $h^{top}(lch(t))$)
    else
        $h^{bot}(lch(t)) \leftarrow 0, \mathcal{N}^{l,t} = \emptyset$
    end if
    hasright~p(rch(t)| $\hat{h}^{top}(rch(t))$) using Eq. (4)
    if hasright then
        Create rch(t), and let $h^{bot}(rch(t))$, $\mathcal{N}^{r,t}$ ← recursive(rch(t), $h^{top}(rch(t))$))
    else
        $h^{bot}(rch(t)) \leftarrow 0, \mathcal{N}^{r,t} = \emptyset$
    end if
    $h^{bot}(t) = \text{TreeCell}^{bot}(h^{bot}(lch(t)), h^{bot}(rch(t)))$
    $\mathcal{N}^t = \mathcal{N}^{l,t} \cup \mathcal{N}^{r,t}$
    Return $h^{bot}(t), \mathcal{N}^t$
end function

--- where isleaf(t) returns "true" is vertex t is a leaf vertex and "false" otherwise, hasleft is a Boolean variable indicating whether vertex t has a left child vertex, $\mathcal{N}^{l,t}$ denotes the set of vertices that are in the left sub-tree of vertex t, hasright is a Boolean variable indicating whether vertex t has a right child vertex, $\mathcal{N}^{r,t}$ denotes the set of vertices that are in the right sub-tree of vertex t, $\mathcal{N}^t$ denotes the set of vertices that are in either the left sub-tree or the right sub-tree of vertex t, and $\text{TreeCell}^{bot}(\bullet,\bullet)$ denotes the operations performed by a TreeLSTM cell.

After generating the edge tree 404, the edge generation system 400 can determine the edge set embedding from one or more of the tree state embeddings associated with one or more of the vertices in the tree. For example, the edge generation system 400 can determine the context embedding to be equal to the tree state embedding $h^{bot}(\text{root})$ (e.g., as defined in equation (5)) for the root vertex of the edge tree 404.

Generating the edge set 406 using the recursive decomposition defined by the edge tree enables the edge generation system 400 to efficiently generate the edge set, particularly when the edge set is sparse. More specifically, the edge generation system 400 only builds out the edge tree to the depth of a leaf vertex associated with a single node index for those leaf vertices that represent edges in the graph, and otherwise terminates the recursive vertex generation at a lower depth in the tree. Thus generating a sparse edge set only requires the edge generation system to generate a sparse tree, thereby consuming fewer computational resources that might otherwise be required to generate the edge set, e.g., as a direct output of a neural network, as described above. Generating the edge set for a node using an edge tree can also enable efficient parallelization of operations during training of the graph generation system, as will be described in more detail with reference to FIG. 6.

Figure 5:
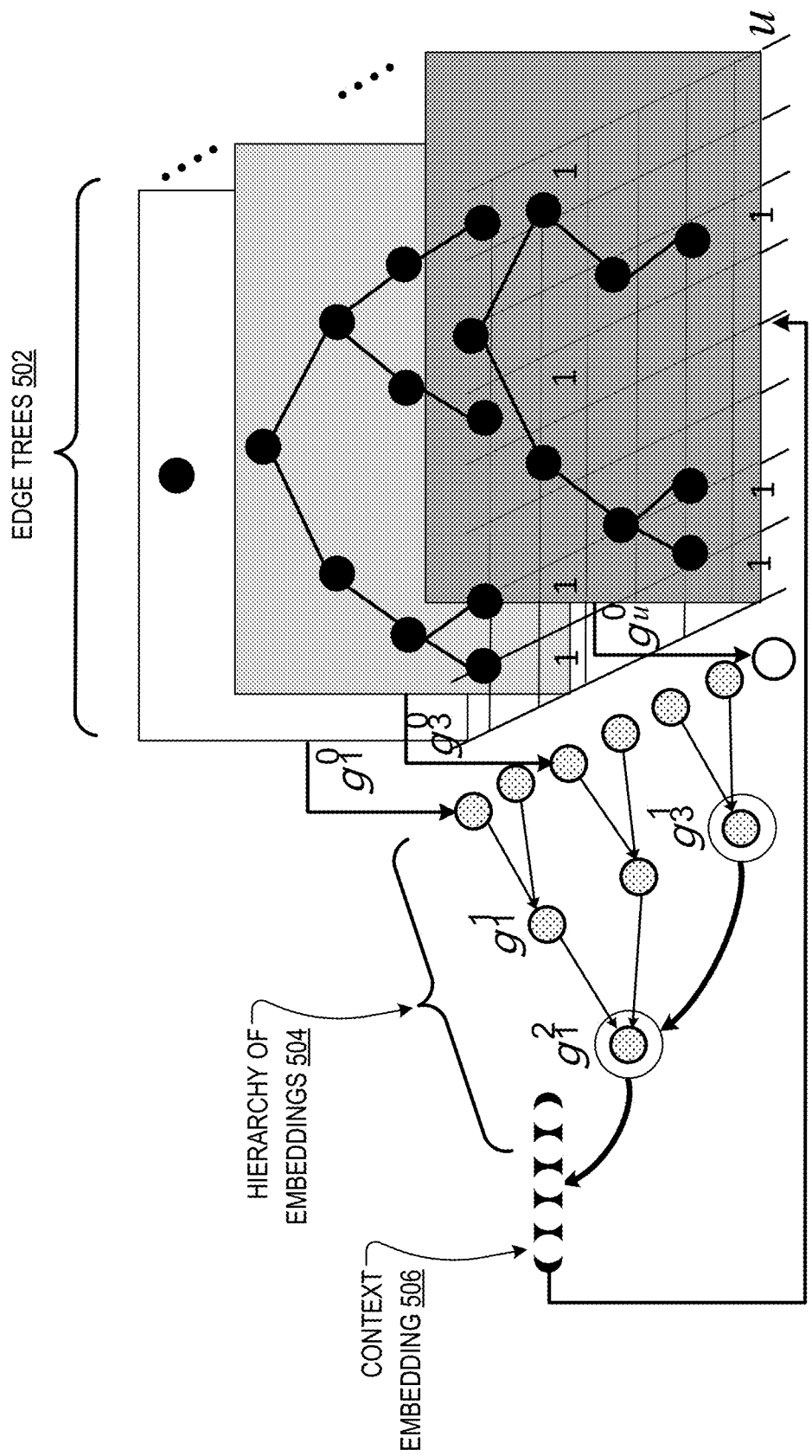
FIG. 5 is an illustration of an example of an overall data flow of operations that can be performed by a graph generation system.

FIG. 5 is an illustration of an example of an overall data flow of operations that can be performed by the graph generation system 200 described with reference to FIG. 2. The graph generation system 200 generates a respective edge set for each node in the graph by constructing a respective edge tree 502 for each node in the graph, e.g., as described with reference to FIG. 4. The graph generation system 200 autoregressively conditions the generation of the respective edge tree for each node based on a context embedding 506 that summarizes the edge set embeddings for the preceding nodes. More specifically, the graph generation system 200 generates the context embedding 506 for each node using a hierarchy of embeddings 504. Level 0 of the hierarchy of embeddings 504 includes the previous edge set embeddings, and the embeddings in each subsequent level of the hierarchy are derived from the embeddings in the preceding level of the hierarchy, as described with reference to FIG. 3.

Figure 6:
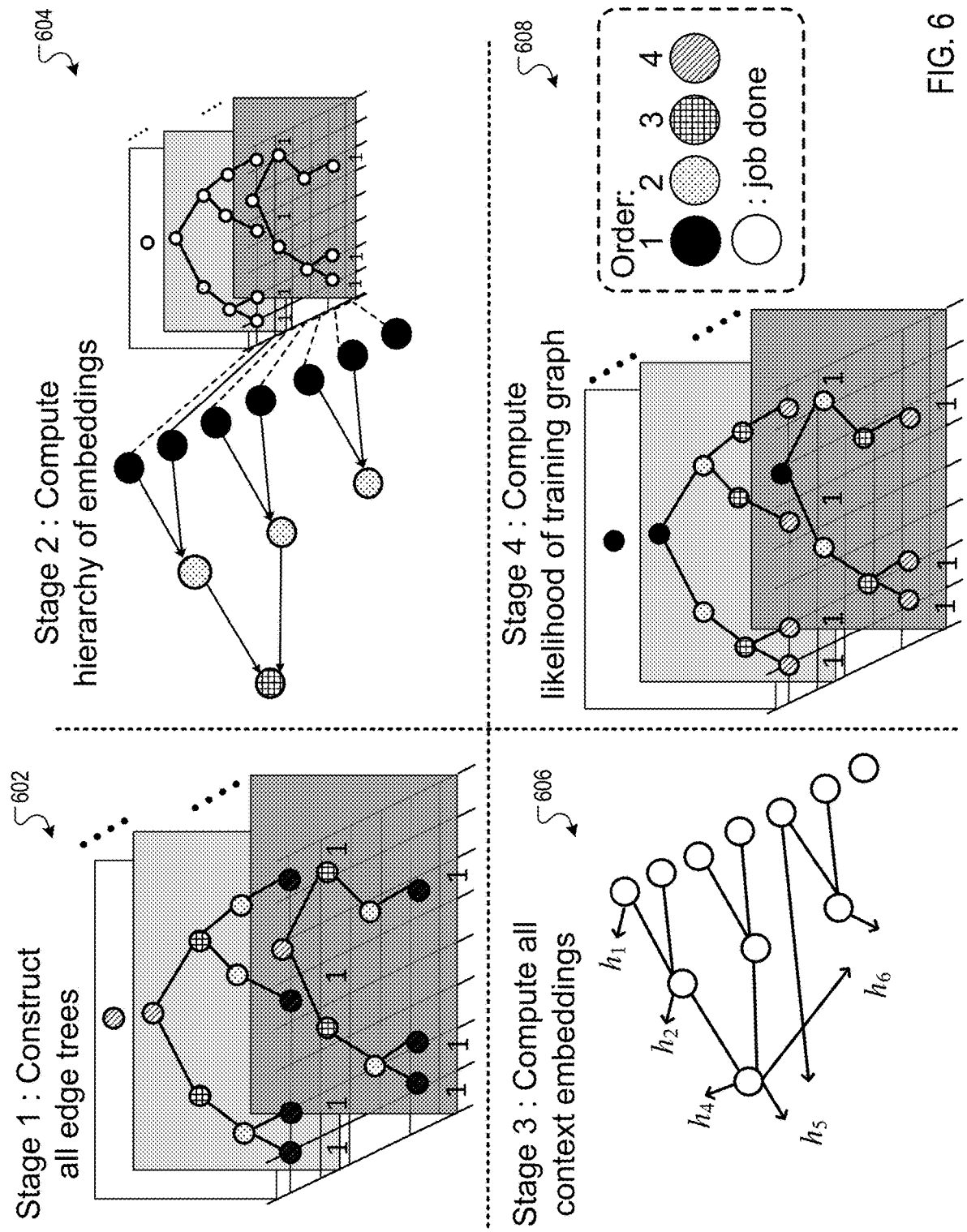
FIG. 6 illustrates operations performed during training of a graph generation system by a training engine.

FIG. 6 illustrates operations performed during training of the graph generation system by a training engine, as will be described in more detail next.

Generally, training the graph generation system can refer to iteratively adjusting the parameter values of the graph generation system to optimize an objective function based on a set of training graphs.

The parameter values of the graph generation system can include, e.g., the parameter values of the neural network layers used by the context embedding system 300 described with reference to FIG. 3, and the parameter values of the neural network layers used by the edge generation system 400 described with reference to FIG. 4.

The objective function can measure, for each training graph, a likelihood of the training graph under the current parameter values of the graph generation system. That is, the objective function can measure, for each training graph, a likelihood that the training graph would be generated by the graph generation system in response to a query using the current parameter values of the graph generation system. Optimizing the objective function thus causes the graph generation system to learn the distribution of the training graphs by increasing the likelihood that the graph generation system would generate the training graphs in response to queries.

The training engine can determine the likelihood of a training graph under the current parameter values of the graph generation system by a sequence of four parallelizable stages, which will each be described in more detail next.

At stage 1 (602), the training engine can use the edge generation system 400 described with reference to FIG. 4 to generate the respective edge tree for each node in the training graph. The training engine can generate the respective edge tree for each node in the training graph in parallel, because the respective edge set for each node in the training graph is already known. As part of generating each edge tree, the training engine can generate at least some of the tree state embeddings associated with the vertices in the edge tree, and can use the tree state embeddings to generate the edge set embedding for each node in the training graph. For example, the training engine can generate the $h^{bot}(t)$ tree state embeddings described with reference to equation (5) for each vertex t in each edge tree. The training engine can then set the edge set embedding for each node equal to the $h^{bot}(root)$ tree state embedding for the root vertex of the edge tree for the node.

At stage 2 (604), the training engine can process the edge set embeddings for each node in the training graph using the context embedding system described with reference to FIG. 3 to generate a hierarchy of embeddings derived from the edge set embeddings. The training engine can generate the embeddings in each level in the hierarchy in parallel.

At stage 3 (606), the training engine processes the hierarchy of embeddings using the context embedding system described with reference to FIG. 3 to generate a respective context embedding for each node in the training graph, e.g., in accordance with equation (2) described with reference to FIG. 3. It can be appreciated that generating the context embedding using the hierarchy of embeddings enables significantly higher parallelization than could be achieved, e.g., if the context embeddings were generated by sequentially processing the edge set embeddings using a recurrent neural network.

At stage 4 (608), the training engine processes the context embeddings for each node in the training graph to determine the likelihood of the training graph. In particular, the training engine uses the context embeddings to evaluate the likelihood the respective edge set of each node in the training graph, e.g., using equations (3)-(4), and then determines the likelihood the training graph as a product of the likelihoods of the edge sets. The training engine can again parallelize the operations of this stage, e.g., by computing the likelihood of the respective edge set corresponding to each node in the training graph in parallel.

Each of the four stages are at least partially parallelizable and can require only O(log n) steps of synchronization, where n is the number of nodes in the training graph, thus allowing the graph generation system to be efficiently trained on large training graphs.

In some cases, the training engine can split the computations performed to determine the likelihood of a training graph over multiple computing units (e.g., graphics processing units, GPUs), e.g., if the training graph cannot fit into the memory of a single computing unit. For example, the training engine can partition the nodes of the training graph into multiple groups, and assign each group of nodes to a respective computing unit. In this example, stage 1 and stage 4 of the process for generating the likelihood of the training graph (as described above) can be performed concurrently by each computing unit without synchronization.

The training engine can iteratively update the parameter values of the graph generation system using any appropriate machine learning training technique, e.g., a stochastic gradient descent training technique. As part of performing stochastic gradient descent, the training engine can determine gradients of the objective function with respect to the parameters of the graph generation system, e.g., using backpropagation. The training engine can update the parameter values of the graph generation system using gradients of the objective function using any appropriate gradient descent/ascent optimization technique, e.g., RMSprop or Adam.

Figure 7:
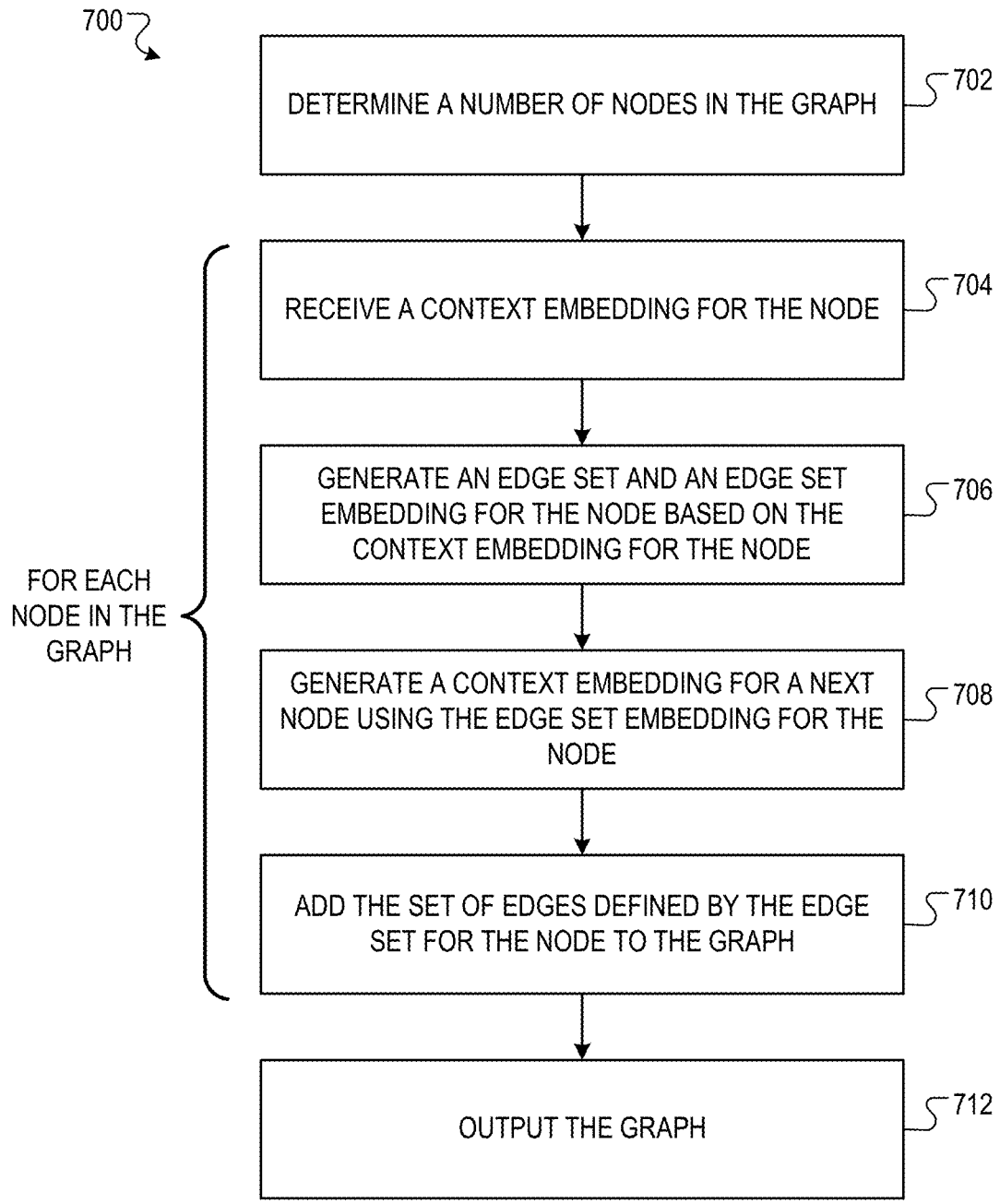
FIG. 7 is a flow diagram of an example process for generating data defining a graph.

FIG. 7 is a flow diagram of an example process 700 for generating data defining a graph. For convenience, the process 700 will be described as being performed by a system of one or more computers located in one or more locations. For example, a graph generation system, e.g., the graph generation system 200 of FIG. 2, appropriately programmed in accordance with this specification, can perform the process 700.

The system determines a number of nodes in the graph (702). For example, the system can determine the number of nodes in the graph by sampling a value from a predefined probability distribution (e.g., a Normal distribution) over a set of positive integer values.

The system sequentially generates a respective edge set for each node in the graph starting from a first node in an ordering of the nodes in the graph by performing the steps 704-710 for each node in the graph. For convenience, steps 704-710 are described with reference to a "current" node in the graph.

The system receives a context embedding for the current node (704). If the current node is the first node in the ordering of the nodes, then the context embedding can be a default context embedding. If the current node is after the first node in the ordering of the nodes, then the context embedding can summarize a respective edge set for each node that precedes the current node in the ordering of the nodes.

The system generates, based on the context embedding for the current node: (i) a respective edge set for the current node, and (ii) a respective embedding of the edge set for the current node (706). For example, the system can construct a tree, conditioned on the context embedding for the current node, that includes leaf vertices that define the edge set for the current node. Each vertex in the tree can be associated with a respective interval of one or more node indices from a set of node indices that indexes the nodes in the graph. Each child vertex can be associated with an interval of node indices that is a proper subset of an interval of node indices associated with a parent vertex of the child vertex. If the tree includes a leaf vertex that is associated with a single node index of a target node, the system can determine that the graph includes an edge between the current node and the target node.

To construct the tree, the system can instantiate a root vertex in the tree. For each vertex in the tree starting from the root vertex, the system can determine if the vertex has each of multiple possible child vertices, and in response to determining that the vertex has a possible child vertex, the system can recursively transition into the child vertex to generate a sub-tree rooted at the child vertex. To determine if a vertex has a possible child vertex, the system can process one or more tree state embeddings associated with the vertex that collectively represent a current state of the tree using one or more neural network layers to generate a probability value. The system can then probabilistically determine if the vertex has the possible child vertex based on the probability value.

The system can condition the construction of the tree on the context embedding for the current node by initializing one or more tree state embeddings associated with the root vertex in the tree based on the context embedding for the node. After constructing the tree, the system can determine the embedding of the edge set for the current node based on one or more tree state embeddings generated for the root vertex of the tree.

The system generates a context embedding for a next node in the ordering of the nodes using the embedding of the edge set for the current node (708). For example, to generate the context embedding for the next node, the system can update a first level of a hierarchical arrangement of embeddings in multiple levels by adding the embedding of the edge set for the current node to the first level. The system can propagate the update to the first level in the hierarchical arrangement of embeddings into each subsequent level in the hierarchical arrangement of embeddings. The system can then generate the context embedding for the next node based on the updated hierarchical arrangement of embeddings.

The system adds the set of edges defined by the edge set for the node to the graph (710).

After adding the edge set for each node to the graph, the system provides an output that includes the data defining the graph (712).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   generating data defining a graph using a neural network system with a set of neural network parameters having trained values that have been determined by a machine learning training technique, wherein the graph comprises: (i) a plurality of nodes, and (ii) a plurality of edges that each connect a respective pair of nodes in the graph, wherein generating the graph using the neural network system comprises:
   determining a number of nodes in the graph;
   sequentially generating a respective edge set for each node in the graph starting from a first node in an ordering of the nodes in the graph, wherein the edge set for each node defines a set of edges in the graph corresponding to the node, wherein for each of a plurality of nodes after a first node in the ordering of nodes, generating the edge set for the node comprises:
   receiving a context embedding for the node that summarizes a respective edge set for each node that precedes the node in the ordering of the nodes;
   generating, based on the context embedding for the node: (i) a respective edge set for the node, and (ii) a respective embedding of the edge set for the node, using the neural network system and in accordance with the trained values of the set of neural network parameters of the neural network system;
   generating a context embedding for a next node in the ordering of the nodes using the embedding of the edge set for the node using the neural network system and in accordance with the trained values of the set of neural network parameters of the neural network system, comprising:
    updating a first level of a hierarchical arrangement of embeddings having a plurality of levels by adding the embedding of the edge set for the node to the first level;
    propagating the update to the first level in the hierarchical arrangement of embeddings into each subsequent level in the hierarchical arrangement of embeddings,
    wherein each embedding in each level after the first level in the hierarchical arrangement of embeddings is derived from two or more embeddings at a preceding level in the hierarchical arrangement of embeddings;
    generating the context embedding for the next node based on the updated hierarchical arrangement of embeddings; and
    providing the updated hierarchical arrangement of embeddings for use in generating the edge set for a next node in the ordering of the nodes; and
  adding the set of edges defined by the edge set for the node to the graph; and
  providing an output comprising the data defining the graph.

2. The method of claim 1, wherein for one or more subsequent levels, propagating the update to the first level in the hierarchical arrangement of embeddings into the subsequent level comprises:
    generating a new embedding by processing two or more embeddings from a preceding level in the hierarchical arrangement of embeddings using one or more neural network layers; and
    updating the subsequent level by adding the new embedding to the subsequent level.

3. The method of claim 1, wherein for one or more subsequent levels, propagating the update to the first level in the hierarchical arrangement of embeddings into the subsequent level comprises:
    determining that the subsequent level should not be updated.

4. The method of claim 1, wherein propagating the update to the first level in the hierarchical arrangement of embeddings into each subsequent level in the hierarchical arrangement of embeddings comprises:
    adding a new level that includes at least one new embedding to the hierarchical arrangement of embeddings.

5. The method of claim 1, wherein a number of embeddings in each level of the hierarchical arrangement of embeddings decreases exponentially with each level in the hierarchical arrangement of embeddings.

6. The method of claim 1, wherein generating the context embedding for the next node based on the updated hierarchical arrangement of embeddings comprises:
    selecting one or more embeddings from the updated hierarchical arrangement of embeddings, wherein the selected embeddings include at least one embedding from a level after the first level; and
    processing the selected embeddings using one or more neural network layers to generate the context embedding for the next node.

7. The method of claim 6, wherein selecting one or more embeddings from the updated hierarchical arrangement of embeddings comprises:
    selecting the embeddings based on an index of the next node.

8. The method of claim 6, wherein processing the selected embeddings using one or more neural network layers to generate the context embedding for the next node comprises:
    sequentially processing each selected embedding using one or more recurrent neural network layers.

9. The method of claim 1, generating the edge set for the node comprises:
    constructing a tree, conditioned on the context embedding for the node, that comprises one or more leaf vertices that each identify a respective target node in the graph; and
    determining that the graph includes a respective edge between: (i) the node, and (ii) each target node identified by a respective leaf vertex.

10. The method of claim 9, wherein each vertex in the tree is associated with a respective interval of one or more node indices from a set of node indices that indexes the nodes in the graph, and wherein each child vertex is associated with an interval of node indices that is a proper subset of an interval of node indices associated with a parent vertex of the child vertex.

11. The method of claim 9, wherein constructing the tree comprises:
    instantiating a root vertex in the tree; and
    for each vertex in the tree starting from the root vertex:
        determining if the vertex has each of multiple possible child vertices; and
        in response to determining that the vertex has a possible child vertex, recursively transitioning into the child vertex to generate a sub-tree rooted at the child vertex.

12. The method of claim 11, wherein determining if the vertex has a possible child vertex comprises:
    processing one or more tree state embeddings associated with the vertex that collectively represent a current state of the tree using one or more neural network layers to generate a probability value; and
    probabilistically determining if the vertex has the possible child vertex based on the probability value.

13. The method of claim 12, further comprising conditioning the construction of the tree on the context embedding for the node by initializing one or more tree state embeddings associated with the root vertex in the tree based on the context embedding for the node.

14. The method of claim 12, wherein generating the embedding of the edge set for the node comprises, after constructing the tree:
    determining the embedding of the edge set for the node based on one or more tree state embeddings generated for the root vertex of the tree.

15. The method of claim 9, wherein the tree is a binary tree.

16. The method of claim 1, wherein generating the edge set for the first node in the ordering of the nodes comprises:
    receiving a default context embedding;
    generating, based on the default context embedding for the first node: (i) a respective edge set for the first node, and (ii) a respective embedding of the edge set for the first node;
    generating a context embedding for a next node in the ordering of the nodes using the embedding of the edge set for the first node; and
    adding the set of edges defined by the edge set for the first node to the graph.

17. The method of claim 1, wherein the graph represents a protein structure or a chip graph.

18. The method of claim 17, wherein the graph represents a chip graph comprising (i) a plurality of nodes, each representing a respective logical operation, and (ii) a plurality of edges, each defining a routing of inputs to and outputs of the logical operations in an integrated circuit.

19. The method of claim 18, wherein the logical operations comprise one or more of an AND, OR, NOT, or XOR operation.

20. The method of claim 18, further comprising training the neural network system with the machine learning training technique to generate a synthetic chip graph drawn from a same distribution as a set of real chip graphs, wherein the training comprises, for one or more real training chip graphs:
   processing the real training chip graph using the neural network system;
   determining a measure of likelihood for the real training chip graph, wherein determining a measure of likelihood comprises, for each node in the chip graph:
      generating a respective edge set for each node in the chip graph, wherein each edge set comprises a tree of one or more leaf vertices, each indicative of one or more routings of inputs to and outputs of the logical operations in the integrated circuit of the real training chip graph;
      embedding each edge set to generate one or more edge set embeddings;
      processing the one or more edge set embeddings to generate a context embedding for each node by deriving a hierarchy of embeddings from each edge set embedding;
      processing the context embedding for each node to determine the likelihood of the training graph, wherein processing the context embedding comprises evaluating the likelihood of a respective edge set of each node in the real training chip graph, in accordance with a set of one or more criteria; and
   updating the values of the set of one or more neural network parameters in the neural network system based at least on the likelihood of the real training chip graph.

21. The method of claim 20, further comprising generating one or more synthetic chip graphs using the neural network system.

22. The method of claim 21, wherein the one or more synthetic chip graphs comprise a set or an augmented set of training data for training a chip placement machine learning model.

23. The method of claim 20, further comprising generating one or more completions of a partial chip graph using the neural network system.

24. A system comprising:
   one or more computers; and
   one or more storage devices communicatively coupled to the one or more computers,
   wherein the one or more storage devices store instructions that, when executed by the one or more computers, cause the one or more computers to perform operations comprising:
      generating data defining a graph using a neural network system with a set of neural network parameters having trained values that have been determined by a machine learning training technique, wherein the graph comprises: (i) a plurality of nodes, and (ii) a plurality of edges that each connect a respective pair of nodes in the graph, wherein generating the graph using the neural network system comprises:
      determining a number of nodes in the graph;
      sequentially generating a respective edge set for each node in the graph starting from a first node in an ordering of the nodes in the graph, wherein the edge set for each node defines a set of edges in the graph corresponding to the node, wherein for each of a plurality of nodes after a first node in the ordering of nodes, generating the edge set for the node comprises:
         receiving a context embedding for the node that summarizes a respective edge set for each node that precedes the node in the ordering of the nodes;
         generating, based on the context embedding for the node: (i) a respective edge set for the node, and (ii) a respective embedding of the edge set for the node, using the neural network system and in accordance with the trained values of the set of neural network parameters of the neural network system;
         generating a context embedding for a next node in the ordering of the nodes using the embedding of the edge set for the node using the neural network system and in accordance with the trained values of the set of neural network parameters of the neural network system, comprising:
            updating a first level of a hierarchical arrangement of embeddings having a plurality of levels by adding the embedding of the edge set for the node to the first level;
            propagating the update to the first level in the hierarchical arrangement of embeddings into each subsequent level in the hierarchical arrangement of embeddings,
            wherein each embedding in each level after the first level in the hierarchical arrangement of embeddings is derived from two or more embeddings at a preceding level in the hierarchical arrangement of embeddings;
            generating the context embedding for the next node based on the updated hierarchical arrangement of embeddings; and
            providing the updated hierarchical arrangement of embeddings for use in generating the edge set for a next node in the ordering of the nodes; and
         adding the set of edges defined by the edge set for the node to the graph; and
      providing an output comprising the data defining the graph.

25. One or more non-transitory computer storage media storing instructions that when executed by one or more computers cause the one or more computers to perform operations comprising:
   generating data defining a graph using a neural network system with a set of neural network parameters having trained values that have been determined by a machine learning training technique, wherein the graph comprises: (i) a plurality of nodes, and (ii) a plurality of edges that each connect a respective pair of nodes in the graph, wherein generating the graph using the neural network system comprises:
   determining a number of nodes in the graph;
   sequentially generating a respective edge set for each node in the graph starting from a first node in an ordering of the nodes in the graph, wherein the edge set for each node defines a set of edges in the graph corresponding to the node, wherein for each of a plurality of nodes after a first node in the ordering of nodes, generating the edge set for the node comprises:

receiving a context embedding for the node that summarizes a respective edge set for each node that precedes the node in the ordering of the nodes;

generating, based on the context embedding for the node: (i) a respective edge set for the node, and (ii) a respective embedding of the edge set for the node, using the neural network system and in accordance with the trained values of the set of neural network parameters of the neural network system;

generating a context embedding for a next node in the ordering of the nodes using the embedding of the edge set for the node using the neural network system and in accordance with the trained values of the set of neural network parameters of the neural network system, comprising:

updating a first level of a hierarchical arrangement of embeddings having a plurality of levels by adding the embedding of the edge set for the node to the first level;

propagating the update to the first level in the hierarchical arrangement of embeddings into each subsequent level in the hierarchical arrangement of embeddings, wherein each embedding in each level after the first level in the hierarchical arrangement of embeddings is derived from two or more embeddings at a preceding level in the hierarchical arrangement of embeddings;

generating the context embedding for the next node based on the updated hierarchical arrangement of embeddings; and providing the updated hierarchical arrangement of embeddings for use in generating the edge set for a next node in the ordering of the nodes; and adding the set of edges defined by the edge set for the node to the graph; and providing an output comprising the data defining the graph.

26. The non-transitory computer storage media of claim 25, wherein for one or more subsequent levels, propagating the update to the first level in the hierarchical arrangement of embeddings into the subsequent level comprises:

generating a new embedding by processing two or more embeddings from a preceding level in the hierarchical arrangement of embeddings using one or more neural network layers; and updating the subsequent level by adding the new embedding to the subsequent level.

* * * * *